United States Patent
Cohen

(10) Patent No.: US 8,224,720 B2
(45) Date of Patent: Jul. 17, 2012

(54) SYSTEM AND METHOD FOR TRACKING INVENTORY

(75) Inventor: Alan J. Cohen, Commack, NY (US)

(73) Assignee: Harome Development LLC, Commack, NY (US)

( * ) Notice: Subject to any disclaimer, the term of this patent is extended or adjusted under 35 U.S.C. 154(b) by 394 days.

(21) Appl. No.: 12/621,232

(22) Filed: Nov. 18, 2009

(65) Prior Publication Data

US 2011/0119162 A1    May 19, 2011

(51) Int. Cl.
G06Q 30/00    (2012.01)
(52) U.S. Cl. ............................................... 705/28
(58) Field of Classification Search ............. 705/28
See application file for complete search history.

(56) References Cited

U.S. PATENT DOCUMENTS

| | | | |
|---|---|---|---|
| 5,884,300 A | 3/1999 | Brockman | |
| 2005/0075954 A1 | 4/2005 | Matsumoto et al. | |
| 2005/0182696 A1* | 8/2005 | Shatzkin et al. | 705/28 |
| 2005/0246246 A1 | 11/2005 | Nishimoto et al. | |
| 2007/0005458 A1* | 1/2007 | Dillard | 705/28 |
| 2008/0082427 A1* | 4/2008 | Gandhi et al. | 705/28 |
| 2008/0086392 A1 | 4/2008 | Bishop et al. | |

* cited by examiner

Primary Examiner — Yogesh C Garg
(74) Attorney, Agent, or Firm — Akerman Senterfitt

(57) ABSTRACT

A computer-based system for tracking inventory based on sales. The system can include a processor configured to process, manage, and analyze data. Additionally, the system can include a computing device operably coupled to the processor, wherein the computing device is associated with an entity. Notably, the processor can be configured to request information associated with a product from the computing device, wherein the information comprises an on-hand inventory quantity of the product and a total sales quantity of the product for a designated period of time for the entity and receive the requested information associated with the product from the computing device. The processor can also be configured to determine whether the on-hand inventory quantity is at least one and the total sales quantity of the product for the designated period of time is zero. Furthermore, the processor can be configured to select the entity when it is determined that the on-hand inventory quantity is at least one and the total sales quantity of the product for the designated period of time is zero.

21 Claims, 4 Drawing Sheets

CPU = CENTRAL PROCESSING UNIT
RS = RETAIL STORE
DF = DISTRIBUTION FACILITY

200

| DATE | WTA SKU NUMBER | BR Cat No | CITY SOLD | STORE# | STORE LOCATION | IDC | STORE OnHand | NET SHIP QTY |
|---|---|---|---|---|---|---|---|---|
| 9/8/2008 | 865185 | AC-BRDG-MINI | 0 | 1 | "ROGERS, AR" | 7042 | 1 | 0 |
| 9/13/2008 | 865185 | AC-BRDG-MINI | 0 | 1 | "ROGERS, AR" | 7042 | 1 | 0 |
| 9/20/2008 | 865185 | AC-BRDG-MINI | 0 | 1 | "ROGERS, AR" | 7042 | 1 | 0 |
| 9/27/2008 | 865185 | AC-BRDG-MINI | 0 | 1 | "ROGERS, AR" | 7042 | 1 | 0 |
| 10/4/2008 | 865185 | AC-BRDG-MINI | 0 | 1 | "ROGERS, AR" | 7042 | 1 | 0 |
| 10/11/2008 | 865185 | AC-BRDG-MINI | 0 | 1 | "ROGERS, AR" | 7042 | 1 | 0 |
| 10/18/2008 | 865185 | AC-BRDG-MINI | 0 | 1 | "ROGERS, AR" | 7042 | 1 | 0 |
| 10/25/2008 | 865185 | AC-BRDG-MINI | 0 | 1 | "ROGERS, AR" | 7042 | 1 | 0 |
| 11/1/2008 | 865185 | AC-BRDG-MINI | 0 | 1 | "ROGERS, AR" | 7042 | 1 | 0 |
| 9/6/2008 | 834851 | AC-L | 0 | 1 | "ROGERS, AR" | 7042 | 3 | 0 |
| 9/13/2008 | 834851 | AC-L | 0 | 1 | "ROGERS, AR" | 7042 | 3 | 0 |
| 9/20/2008 | 834851 | AC-L | 0 | 1 | "ROGERS, AR" | 7042 | 2 | 0 |
| 10/4/2008 | 834851 | AC-L | 0 | 1 | "ROGERS, AR" | 7042 | 2 | 0 |
| 10/11/2008 | 834851 | AC-L | 0 | 1 | "ROGERS, AR" | 7042 | 2 | 0 |
| 9/13/2008 | 834858 | AC-M | (1) | 1 | "ROGERS, AR" | 7042 | 8 | 0 |
| 9/20/2008 | 834858 | AC-M | 0 | 1 | "ROGERS, AR" | 7042 | 7 | 0 |
| 9/27/2008 | 834858 | AC-M | 0 | 1 | "ROGERS, AR" | 7042 | 6 | 0 |
| 10/25/2008 | 834858 | AC-M | 0 | 1 | "ROGERS, AR" | 7042 | 5 | 0 |
| 11/1/2008 | 834858 | AC-M | 0 | 1 | "ROGERS, AR" | 7042 | 5 | 0 |
| 9/27/2008 | 834832 | AC-MINI | 0 | 1 | "ROGERS, AR" | 7042 | 20 | 0 |
| 11/1/2008 | 834832 | AC-MINI | 0 | 1 | "ROGERS, AR" | 7042 | 21 | 12 |
| 9/6/2008 | 834865 | ACS | 0 | 1 | "ROGERS, AR" | 7042 | 10 | 0 |
| 9/20/2008 | 834865 | ACS | 0 | 1 | "ROGERS, AR" | 7042 | 10 | 6 |
| 9/27/2008 | 834865 | ACS | 0 | 1 | "ROGERS, AR" | 7042 | 10 | 0 |
| 10/11/2008 | 834865 | ACS | 0 | 1 | "ROGERS, AR" | 7042 | 9 | 0 |
| 11/1/2008 | 834855 | ACS | 0 | 1 | "ROGERS, AR" | 7042 | 17 | 0 |

PAGE 1

| ITEM NBR | VENDOR STOCK NUMBER | ITEM DESC 1 | WEEK OF 9/13/08 ||||| WEEK OF 11/1/08 |||||
|---|---|---|---|---|---|---|---|---|---|---|---|---|
| | | | TRAITED/ VALID STORE COUNT | NUMBER OF STORES WITH 0 POS | % OF STORES WITH 0 POS | NUMBER OF STORES WITH 0 ON HAND WITH 0 POS | % OF STORES WITH 0 ON HAND | TRAITED/ VALID STORE COUNT | NUMBER OF STORES WITH 0 POS | % OF STORES WITH 0 POS | NUMBER OF STORES WITH 0 ON HAND WITH 0 POS | % OF STORES WITH 0 ON HAND |
| 834632 | AC-MINI | MINI ASSORTMENT | 3,520 | 1,195 | 33.98% | 65 | 1.85% | 3,518 | 1,400 | 39.97% | 31 | 0.88% |
| 834865 | AC-S | SMALL ORNAMENT | 3,245 | 1,471 | 45.33% | 29 | 0.89% | 3,238 | 1,599 | 49.38% | 13 | 0.40% |
| 834858 | AC-M | MEDIUM ORNAMENT | 3,402 | 2,118 | 62.26% | 31 | 0.91% | 3,397 | 2,137 | 62.91% | 9 | 0.26% |
| 834651 | AC-L | LARGE ORNAMENT | 2,850 | 2,250 | 76.01% | 22 | 0.74% | 2,953 | 2,308 | 78.16% | 7 | 0.24% |
| 856167 | ACF-M-C | MEDIUM CORAL ASSORT | 1,451 | 1,112 | 76.64% | 3 | 0.55% | 1,451 | 1,126 | 77.60% | 6 | 0.34% |
| 856174 | ACF-M-R | MEDIUM ROCK ASSORTME | 3,403 | 2,271 | 76.64% | 28 | 0.82% | 3,398 | 2,333 | 68.70% | 5 | 0.15% |
| 856181 | ACF-M-W | MEDIUM WOOD ASSORTME | 3,406 | 1,895 | 55.60% | 32 | 0.94% | 3,403 | 1,934 | 56.83% | 7 | 0.21% |
| 856188 | ACF-L-C | LARGE CORAL ASSORTME | 2,954 | 2,531 | 85.68% | 34 | 1.15% | 2,950 | 2,523 | 85.53% | 12 | 0.41% |
| 856153 | ACF-L-R | LARGE ROCK ASSORTME | 1,437 | 1,085 | 75.57% | 7 | 0.49% | 1,438 | 1,132 | 75.72% | 12 | 0.83% |
| 856160 | ACF-L-W | LARGE WOOD ASSORTMEN | 2,969 | 2,565 | 89.39% | 25 | 0.84% | 2,963 | 2,578 | 87.01% | 52 | 1.75% |
| 834553 | ACF-XL-R | X-LARGE ROCK ASSORTD | 3,323 | 2,807 | 84.47% | 32 | 0.95% | 3,318 | 2,869 | 88.47% | 12 | 0.38% |
| 834560 | ACF-XL-W | X-LARGE WOOD ASSORTD | 3,336 | 2,007 | 60.18% | 38 | 1.14% | 3,329 | 2,069 | 62.45% | 11 | 0.33% |
| 834545 | ACF-XXL-RW | XX-LARGE ROCKWOOD | 2,427 | 1,877 | 77.34% | 23 | 0.95% | 2,424 | 1,800 | 76.38% | 9 | 0.37% |
| 834639 | ACOW-1 | DRIFTWOOD ASSORTMENT | 1,450 | 905 | 62.41% | 8 | 0.55% | 1,449 | 940 | 64.87% | 2 | 0.14% |
| 835807 | ACC-MINI | MINI CORAL ASSORTMENT | 2,971 | 2,035 | 68.50% | 28 | 0.94% | 2,958 | 2,103 | 70.86% | 10 | 0.34% |
| 833814 | ACC-SMALL | SMALL CORAL ASSORTMANT | 2,415 | 1,851 | 77.89% | 15 | 0.68% | 2,409 | 1,918 | 79.54% | 8 | 0.33% |
| 865188 | ACF-BRDG-MINI | MINI BRIDGE ASTM | 2,976 | 1,761 | 59.27% | 38 | 1.28% | 2,970 | 1,837 | 81.85% | 22 | 0.74% |
| 805076 | AC-FFC-S | FUN FISH CAVE ASST | 3,304 | 2,050 | 52.05% | 59 | 1.79% | 3,300 | 2,052 | 63.08% | 32 | 0.97% |

FIG. 3

```
                          ┌─────────────────────────────────────────┐
                          │                                    400  │
                          │                                         │
                          │   RECEIVING AN ON - HAND INVENTORY      │
                          │   QUANTITY OF A PRODUCT AND A TOTAL     │
                          │   SALES QUANTITY OF THE PRODUCT FOR A   │
                          │   DESIGNATED PERIOD OF TIME FOR AN      │
                          │   ENTITY                                │
                          │                   402                   │
                          └─────────────────────────────────────────┘
                                            │
                                            ▼
                          ┌─────────────────────────────────────────┐
                          │   DETERMINING WHETHER THE ON - HAND     │
                          │   INVENTORY QUANTITY AT LEAST ONE AND   │
                          │   THE TOTAL SALES QUANTITY OF THE       │
                          │   PRODUCT FOR THE DESIGNATED PERIOD     │
                          │   OF TIME IS ZERO                       │
                          │                   404                   │
                          └─────────────────────────────────────────┘
                                            │
                                            ▼
                          ┌─────────────────────────────────────────┐
                          │   SELECTING THE ENTITY WHEN IT IS       │
                          │   DETERMINED THAT THE ON - HAND         │
                          │   INVENTORY QUANTITY IS LEAST ONE AND   │
                          │   THE TOTAL SALES QUANTITY OF THE       │
                          │   PRODUCT FOR THE DESIGNATED PERIOD     │
                          │   OF TIME ZERO                          │
                          │                   406                   │
                          └─────────────────────────────────────────┘
```

FIG. 4

SYSTEM AND METHOD FOR TRACKING INVENTORY

FIELD OF THE INVENTION

The present invention is related to the field of inventory tracking, and more particularly, to computer-based systems and methods for tracking inventory.

BACKGROUND OF THE INVENTION

Advances in technology have allowed many companies to more effectively manage and track their inventory. Despite these advances, there continues to be a variety of inefficiencies with regard to operations and inventory management. For example, retailers often do not keep track of or count inventory for a particular product because it can be labor intensive and tedious. Instead, retailers, particularly large retailers, simply keep track of the sales for a given product and receive reports of claimed on-hand inventory quantities from an inventory system. The retailers can then use the sales figures for the product and the claimed on-hand inventory quantities as means to indicate when or if a product is not performing well, or as a means to opt to push more of the products onto the retail store shelves.

Such a methodology can be helpful in some respects, however, it does not provide a robust solution to keeping inventory on shelves. For example, the claimed on-hand inventory quantities reported by an inventory system might not reflect the actual inventory quantities. Such a scenario can occur if inventory has been damaged, certain inventory has been tagged as not sellable, inventory has been misplaced or stolen, shipments of inventory are delayed or shipped to the wrong store, or for other reasons. By allowing inventory inaccuracies to perpetuate in an inventory system, it can cause companies to permanently or temporarily lose sales, appear to have poor performing products, lose customers to companies selling competing products, or even have their products replaced at stores with competitors' products. From a retailer's or other interested party's perspective, they might be losing sales simply because they do not have inventory. Accordingly, it is in the best interest of the retailer, supplier, or other interested party to ensure that correct inventory quantities are reflected in inventory systems.

SUMMARY OF THE INVENTION

The exemplary embodiments are directed to systems and methods for tracking inventory. One or more of the embodiments can involve analyzing claimed on-hand inventory for a particular product and sales for the product during a period of time for an individual entity or store. If it is determined that the claimed on-hand inventory for the product is at least one and there were no sales during the period for the entity or store, then the claimed on-hand inventory may be inaccurate. Such a determination can aid companies in increasing the efficiency and management of their product-related operations.

One embodiment of the invention is a computer-based system for tracking inventory. The system can include a processor configured to process, manage, and analyze data. Additionally, the system can include a computing device operably coupled to the processor, wherein the computing device is associated with an entity. Notably, the processor can be configured to request information associated with a product from the computing device, wherein the information comprises an on-hand inventory quantity of the product and a total sales quantity of the product for a designated period of time for the entity and receive the requested information associated with the product from the computing device. The processor can also be configured to determine whether the on-hand inventory quantity is at least one and the total sales quantity of the product for the designated period of time is zero. Furthermore, the processor can be configured to select the entity when it is determined that the on-hand inventory quantity is at least one and the total sales quantity of the product for the designated period of time is zero.

Another embodiment of the invention is a computer-based method for tracking inventory. The method can include receiving information associated with a product, wherein the information comprises an on-hand inventory quantity of the product and a total sales quantity of the product for a designated period of time for an entity. The method can also include determining whether the on-hand inventory quantity is at least one and the total sales quantity of the product for the designated period of time is zero, wherein the determination is performed by a processor. Moreover, the method can also include selecting the entity when it is determined that the on-hand inventory quantity is at least one and the total sales quantity of the product for the designated period of time is zero.

Yet another embodiment of the invention is a computer-readable medium which contains computer-readable code that when loaded on a computer causes the computer to receive information associated with a product, wherein the information comprises an on-hand inventory quantity of the product and a total sales quantity of the product for a designated period of time for an entity; determine whether the on-hand inventory quantity is at least one and the total sales quantity of the product for the designated period of time is zero, wherein the determination is performed by a processor; select the entity when it is determined that the on-hand inventory quantity is at least one and the total sales quantity of the product for the designated period of time is zero; and generate a report comprising the selected entity.

BRIEF DESCRIPTION OF THE DRAWINGS

There are shown in the drawings, embodiments which are presently preferred. It is expressly noted, however, that the invention is not limited to the precise arrangements and instrumentalities shown.

FIG. 2 is a section of a report illustrating stores having zero sales for a product, while indicating on-hand inventory of at least one.

FIG. 3 is a section of a report illustrating stores with potentially zero products on shelf.

FIG. 4 is a flowchart of steps in a method for tracking inventory, according to another embodiment of the invention.

DETAILED DESCRIPTION

Figure 1:
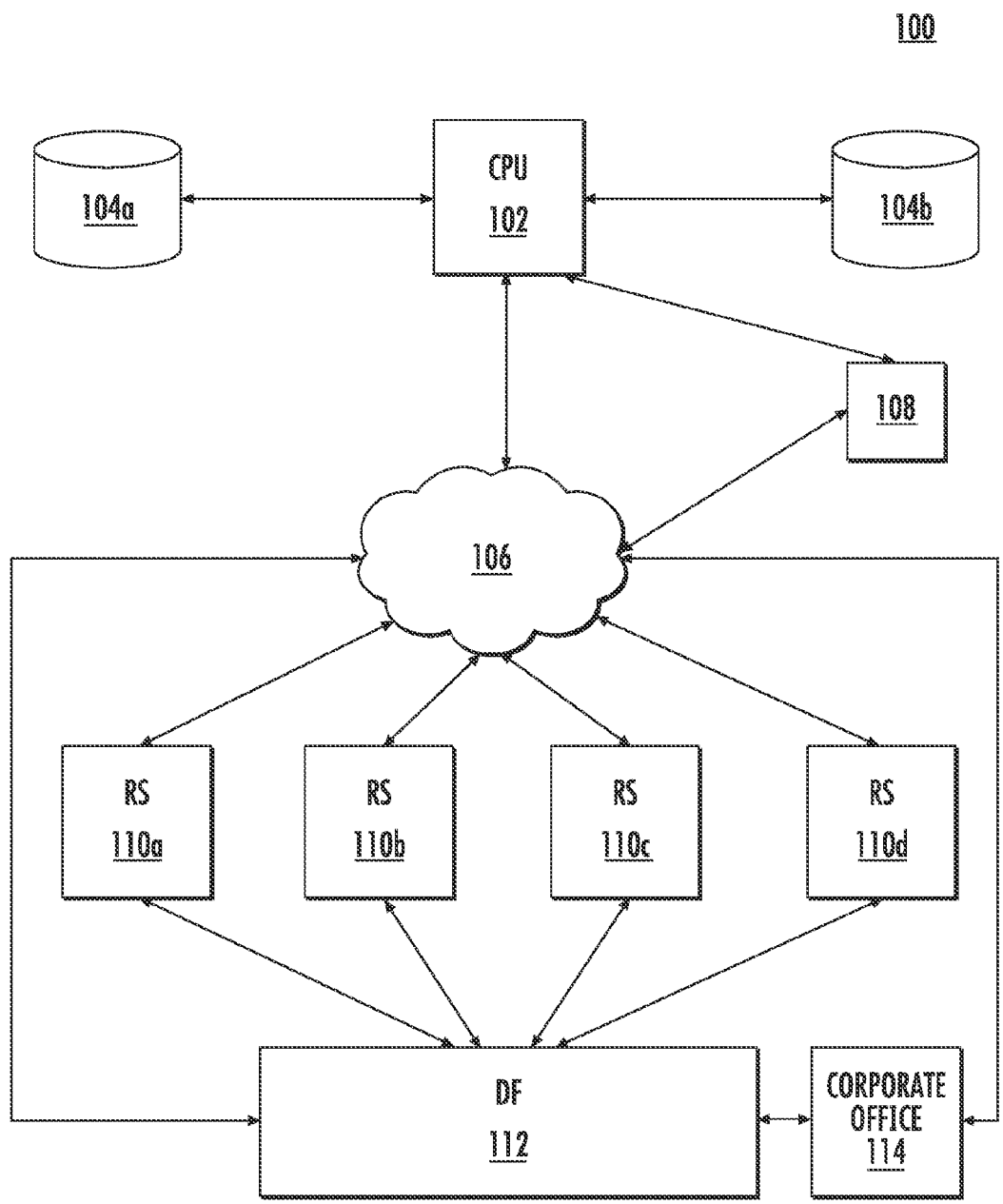
FIG. 1 is a schematic view of a system for tracking inventory, according to one embodiment of the invention.

Referring initially to FIG. 1, a system 100 for tracking inventory, according to one embodiment of the invention, is schematically illustrated. The system can include a processor 102 configured to manage, process, and analyze data. The system 100 can also include a pair of databases 104a-b, which can be communicatively linked to the processor 102. Additionally, the system 100 can include a communications network 106 and a communications device 108. The communications device 108 can include a cellular phone, personal digital assistant (PDA), mobile device, computer, global positioning system (GPS), or other device. The processor 102 can be operably coupled to the communications network 106 and the communications device 108.

Furthermore, the system 100 can include a series of computing devices 110a-d associated with retail stores, a computing device 112 associated with a distribution facility, and a computing device 114 associated with a corporate office, wherein each computing device 110a-d, 112, and 114 can include their own processors and associated databases (not explicitly shown). The computing devices 110a-d, 112, 114 can be databases, computers, servers, mobile devices, or other devices. The computing devices 110a-d can maintain product data associated with their respective stores, the computing device 112 for the distribution facility can maintain cumulative data for any stores associated with it, and the computing device 114 for the corporate office can maintain data for all stores and distribution facilities. Even though one processor 102, two databases 104a-b, one communications network 106, one communications device 108, and six computing devices 110a-d, 112, and 114 are shown, it will be apparent to one of ordinary skill based on the description that a greater number of processors, communications devices and communication networks, and that a greater or lesser number of databases and computing devices can be used according to the invention. The present disclosure also contemplates the use of various configurations of the above-described components, as well as the use of one or more other components.

The processor 102 can be implemented in hardwired, dedicated circuitry for performing the operative functions described herein. In another embodiment, the processor 102 can be implemented using computer-readable code configured to execute on a particular computing machine. In yet another embodiment, however, the processor 102 can be implemented in a combination of hardwired circuitry and computer-readable code.

When operating a business, it is often critical to seek optimum sales performance, particularly at the store level. If retailers or buyers of a particular supplier's products track the sales of the products and the tracked sales indicate that sales are slowing for the supplier's products, the retailers or buyers may conclude that the product has peaked, that the product is of inadequate quality, and/or that the product should be replaced with a competing or other product. Consequently, retailers, buyers, distributors, suppliers, and/or other interested parties often desire to accurately know the true reasons for a product's slowing, stagnant, or unimpressive sales.

Operatively, when a retailer, distributor, buyer, supplier or other interested party desires to track inventory for a product, the retailer, distributor, buyer, supplier or other interested party can utilize processor 102 to request information associated with a product from any or a combination of computing devices 110a-d, 112, and 114 via communications network 106. The information can include, but is not limited to including, an on-hand inventory quantity of the product and a total sales quantity of the product for a designated period of time for the store. Also, the information can include a sales history associated with the product, a product type associated with the product, and/or an entity/store identifier. If the product being tracked is a medium-sized bird cage, then the product type can be pet cages, or more specifically bird cages. The entity/store identifier can be a number or other identifying means to identify a particular entity or store. The designated period of time for the total sales quantity of the product can be determined based on one or more of the sales history of the product and/or similar products, the product's type, and the sales history of the entity or store that the supplier is inquiring about. Additionally, multiple periods of time can be selected and the designated period of times can also be set utilizing the processor 102.

After requesting the information, the processor 102 can be configured to receive the requested information associated with the product from each computing device 110a-d, 112, and 114 requested via the communications network 106. The processor 102 can proceed to determine whether the received on-hand inventory quantity satisfied a first threshold, such as at least one, and whether the total sales quantity of the product for the designated period of time satisfied a second threshold, such as zero. If an entity/store meets both conditions, then it can indicate that the product might not be selling poorly, but rather that there is simply no inventory to sell. Furthermore, the processor 102 can be configured to select and/or flag the entity or store when both conditions are met.

According to an embodiment, the processor 102 can be configured to generate a report which can contain each selected entity/store, other stores, and any other necessary information. Notably, any of the following reports described below can be modified to include information for any type of entity that handles or is associated with inventory. For example, although the following report includes fields related to a store, the report can be modified to include fields associated with other entities that are associated with inventory such as, but not limited to, distributors, buyers, shippers, retailers, suppliers, and other similar entities. After creating the report, the processor 102 can transmit the report to either one or both databases 104a-b for storage and later retrieval. The report can be set up in spreadsheet format or any other format capable of displaying product data. A report can include, but is not limited to including, one or more of a date field, a product number field, a vendor stock number field, a product description field, a store number field, a quantity of stores field, a quantity of product sold field, a claimed on-hand quantity field, a store location field, a field indicating a quantity of stores with zero product on shelf, a field indicating a quantity of stores having zero product on shelf and the on-hand inventory quantity as zero, and other fields.

Referring now also to FIG. 2, a section of a report 200 is shown illustrating stores with zero sales for a product, while indicating on-hand inventory of at least one. Report 200 illustrates part of a sample report featuring a variety of fields for ascertaining valuable information about the inquired product. The report 200 displays the stores selling zero of the tracked products, while having at least one reported product on-hand. The data in each column in the report 200 can be sorted in ascending order, descending order, or some other order. For example, the report 200 shows that for store number one, for the weeks of Sep. 6, 2008 through Nov. 1, 2008, there were zero products sold for a product. However, during the same time period, the retailer claimed to have one unit on-hand for the entire period of time. Such a finding can lead the retailer, distributor, buyer, supplier, and/or other interested party to believe that there, in fact, was not any inventory during the time period, even though the retailer claimed to have one unit on-hand.

When there are zero sales and the retailer's inventory system reports at least one unit on-hand in inventory for a product, additional inventory will not be sent to or received in the individual stores selling zero units of the product. This results because there would be no reason to ship more inventory to the stores since the retailer's inventory system reports having inventory and/or because the products appear to not be selling. Without necessary intervention, the sales for a product will not improve. Accordingly, when a store sells zero units for multiple weeks or some other time period, while also claiming to have inventory on-hand during the time period, it can be assumed or concluded that the store does not have the inventory, the inventory is misplaced or stolen, the inventory is damaged, or the inventory is otherwise unaccounted for. The report 200 can include information and findings for as many products and stores as needed or requested.

Referring now also to FIG. 3, a section of a report 300 illustrating stores with potentially zero products on shelf is shown. The report 300 also illustrates a summary of the determinations made in the system 100. For example, the report 300 shows the total number of stores selling a particular product, the number of stores assumed to have zero products on shelf, the number of stores with zero products on shelf and zero products on-hand, and other data. From these numbers and data, the processor 102 can quickly determine which stores need to be notified and replenished with inventory. For example, for the product in row one of report 300, there are 3,520 stores that sell the product, of which 1,196 were found to have sold zero. This shows that 33.98% of stores selling the product have sold zero products during the week of Sep. 13, 2008. Additionally, the report 300 shows the number of stores with zero on-hand and zero products on shell to be sixty-five stores, which represents 1.85% of the stores selling the product. Such information can be invaluable for a retailer, distributor, supplier, and/or other interested party for determining when to ship out more inventory and what stores to ship the inventory to. The processor 102 can send a signal to the computing devices 110a-d and 112 associated with the selected stores and computing device 114 associated with the corporate office informing them that their on-hand values might be incorrect and/or that the products might be misplaced or stolen. The processor 102 can also send a signal to the computing devices 110a-d, 112, and 114 informing the devices of the quantity of product that needs to be shipped and/or stocked on shelf at the retailers and the distribution facility. Of course, the processor 102 can process information pertaining to more stores and products and a summary of all stores can be sent to one or more distribution facilities, other stores, the corporate offices of the retail store, and/or other locations.

In one embodiment, the processor 102 can be configured to receive information associated with a competing product. Much like above, the information for the competing product can include an on-hand inventory quantity of the competing product and a total sales quantity of the competing product for a designated period of time for a store. The store for the competing product can be the same store as the tracked original product, however, this does not have to be the case. The processor can be further configured to determine whether the on-hand inventory quantity of the competing product is at least one and the total sales quantity of the competing product for the designated period of time is a low value. A low value, for example, can be a quantity of products sold which the supplier, retailer, or third party deems to be low compared to average sales for the designated period of time.

In another embodiment, the processor 102 can be configured to send a notification associated with the competing product and original tracked product to the computing devices 110a-d, 112, and 114 when it is determined that the on-hand inventory quantities of the product and the competing product are at least one and the total sales quantity of the product is zero and the total sales quantity of the competing product is a low value. The notification can indicate, but is not limited to indicating, that a product type associated with the product and competing product is performing poorly. For example, if a bird cage from a supplier A and the competing bird cage from a supplier B are tracked and the system 100 determines that both bird cages have zero sales, while indicating at least one unit on-hand at the same store during a time period, then it can indicate that bird cages in general are performing poorly. This may serve to further indicate that the claimed on-hand inventory value might be correct. Of course, this does not have to be the case and the on-hand inventory value might be incorrect. In yet another embodiment, the processor 102 can be configured to send a signal to a user using communications device 108. The signal can tell the user to validate the findings of the system 100 by going to the store and counting the inventory, to bring more inventory to the store, or to perform some other action.

In still another embodiment, the processor 102 can be configured to perform the operative functions of the system 100 through the use of a software program (not explicitly shown). The software program can be in the form of a website and/or application software, which can be configured to execute on the processor 102. Assuming a website is used, the website can require or request companies and/or individuals trying to track various products to register with the website and login to the website. Additionally, a company's competitors or an individual's competitors can register on the website as well. Furthermore, retailers, distributors, buyers, shippers, and other interested parties can register on the website to utilize the software to determine any potential flaws in their inventory quantities. Information associated with a particular company or individual can be held confidentially and securely from other registrants of the website, unless the company or individual grants another registrant or set of registrants access to its information. Access granted to a particular registrant can be for total access to its information, for a selected subset of information, for a designated period of time, and/or for certain types of uses. For example, a registrant can specify that a competitor can use the registrant's information pertaining to a particular product line for one week. The information associated with a product or products can be input via web forms or other input means associated with the website. Depending on the implementation used for performing the operative functions of the system 100, a company or individual can also transmit the information using wireless services, Electronic Data Interchange (EDI), the Internet, via mail, and other transmission means. Prior to or upon transmission to the website, the information can be encrypted, password protected, or otherwise secured to ensure security and privacy of the information.

Once the information is successfully received by the website, the processor 102 can decrypt the information and determine whether the on-hand inventory quantity associated with a particular product and store in question is at least one and the total sales quantity of the product for the designated period, of time is zero at the store. If so, the processor 102 can select the store and the process can be repeated for more products and stores. The processor 102 can then generate a report, which contains the selected stores and other information tailored to each company or individual, and transmit the report to the store, a distribution facility associated with the store, corporate offices of the store, and/or to other locations. The report can indicate that even though there is claimed to be on-hand inventory that there actually is not any inventory. However, if the processor 102 analyzed at least one other competing product and determined that the competing product is performing poorly in the same store or in another comparable store, the report can indicate that that the claimed on-hand inventory may be correct. The retailer, distributor, buyer, interested party, company or individual can log out after reviewing the report. The generated reported can be stored in a database associated with the website so that when the company, other party, or individual logs back in on another occasion, the generated report is still available for viewing and/or download by the company or individual. Of course, the retailer, distributor, buyer, interested party, company or individual seeking to track products can securely track products using non-website related application software as well.

Referring now to FIG. 4, a flowchart is provided that illustrates certain method aspects of the invention. The flowchart depicts steps of a method 400 for tracking inventory. The method 400 illustratively can include, beginning at step 402, receiving information associated with a product, wherein the information comprises an on-hand inventory quantity of the product and a total sales quantity of the product for a designated period of time for an entity or store. An entity can include, but is not limited to, a distributor, shipper, retailer, supplier, buyer, and other similar entity which handles, stores, or is otherwise associated with inventory. The information can be automatically received at a computing device and can be set to arrive at the computing device based on a schedule. At step 404, the method can include determining whether the on-hand inventory quantity is at least one and the total sales quantity of the product for the designated period of time is zero. The method can also include selecting the entity or store when it is determined that the on-hand inventory quantity is at least one and the total sales quantity of the product for the designated period of time is zero at step 406. It is important to note that any of the method steps can be performed utilizing a processor, computing device, or other device. Additionally, any of the method steps can be performed on a website or application software configured to execute on a processor.

According to an embodiment, the method 400 can include sending a notification to the selected entity or store when the entity or store is selected. Also, the notification and/or a summary of all entities or stores can be sent to one or more distribution facilities, other stores, the corporate offices of the retail store, and/or to other locations. The notification can indicate, but is not limited to indicating, that the product has been misplaced, that the product might be stolen, and/or that the on-hand inventory quantity may be incorrect. In another embodiment, the method 400 can include receiving information associated with the product for one or more other designated period of times for the entity or store. If the entity or store is selected again for the one or more other designated period of times, a notification can be sent to the selected entity or store, one or more distribution facilities, other stores, the corporate offices of the retailer, and/or to other locations. As mentioned above, the notification can indicate product misplacement, product theft, inventory inaccuracies, and/or that the particular entity or store is not performing at the same level as other stores selling the same or similar product.

In one embodiment, the method 400 can include receiving information associated with a competing product, such as where access to, or sharing of such information is permitted by a company (e.g., where the product has been de-identified). For example, if the original product is a bird stand, the competing product can be a comparable bird stand or other pet-related product. The information received about the competing product can be an on-hand inventory quantity and a total sales quantity of the competing product for a designated period of time for a store. Much like the determination made for the original product, the method 400 can include determining whether the on-hand inventory quantity of the competing product is at least one and the total sales quantity of the competing product for the designated period of time is a low value. A low value can be a quantity of products sold which a supplier, retailer or third party deems to be low for the designated period of time.

If it is determined that the on-hand inventory quantities of the product and the competing product are at least one and the total sales quantity of the product is zero and the total sales quantity of the competing product is a low value, a notification can be sent to the entity or store selling the products, distribution facilities, the supplier's corporate offices, the store's corporate offices, and/or to other desired locations. The notification can indicate, but is not limited to indicating that the product type associated with the product and competing product is performing poorly. In another embodiment, the method 400 can include receiving one or more of a sales history, a product type, and a entity/store identifier that can be related to the product. The sales history, the product type, and/or the entity/store identifier can be utilized to determine the designated period of time. For example, if a particular pet cage is only sold on average once every two weeks across all stores carrying the cage, it might not be helpful to set the designated time period for one week. However, if a particular entity or store in question sells ten cages every week, then setting the time period for one week can be helpful.

In yet another embodiment, the method 400 can include requesting the sales and inventory information pertaining to the product and/or competing product. The request can be made via a computing device such as a computer, mobile device, communications device, or other device. In still another embodiment, the method 400 can include generating a report, which can include the selected entity or store, which was determined to have an on-hand inventory quantity of at least one and a total sales quantity of the product for a designated period of time of zero. The report can include one or more of a product number field, a vendor stock number field, a product description field, a quantity of entities/stores field, a field indicating a quantity of stores with zero product on shelf, and a field indicating a quantity of entities or stores having zero product on shelf with the on-hand inventory quantity as zero. The report can be provided in spreadsheet format, electronic document format, or any other format capable of displaying data corresponding to such fields. It is important to note that the method 400 can also include any of the embodiments and the functionality of the system 100.

Notably, the invention is not to be limited to the embodiments of the systems and methods described above and can be adapted to other situations. For example, the systems and methods can be adapted to determine inventory quantities and errors at a distributor, buyer, retailer, supplier, shipper, or other entity which handles or is associated with the inventory. Additionally, the systems, methods, and figures are not limited to the precise configurations and relationships described above. For example, if inventory quantities are being determined at a distributor and the distributor sells directly to consumers, there might not be a retailer. As another example, the supplier may be the entity which supplies and sells the products, in which case, there might not be a distributor or a retailer. Furthermore, the fields in the reports described above can also be changed to reflect data associated with the entity being examined.

The invention can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is suitable. A typical combination of hardware and software can be a general purpose computer system with a computer program that, when being loaded and executed, controls the computer system such that it carries out the methods described herein.

The invention, as already mentioned, can be embedded in a computer program product, such as magnetic tape, an optically readable disk, or other computer-readable medium for storing electronic data. The computer program product can comprise computer-readable code, (defining a computer program) which when loaded in a computer or computer system causes the computer or computer system to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention have been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

I claim:

1. A computer-based method for tracking inventory, the method comprising:
   receiving information associated with a product, wherein the information comprises an on-hand inventory quantity of the product and a total sales quantity of the product for a designated period of time for an entity;
   determining whether the on-hand inventory quantity satisfies a first threshold and the total sales quantity of the product for the designated period of time satisfies a second threshold, the first threshold being at least one and the second threshold being zero, wherein the determination is performed by a processor;
   selecting the entity via the processor when it is determined that the on-hand inventory quantity satisfies the first threshold and the total sales quantity of the product for the designated period of time satisfies the second threshold; and
   sending a notification via the processor when the entity is selected, wherein the notification indicates at least one of possible product misplacement, possible product theft, and that the on-hand inventory quantity may be incorrect.

2. The method of claim 1, further comprising sending the notification to at least one of the entity, a distribution facility associated with the entity, and a corporate office associated with the entity when the entity is selected.

3. The method of claim 1, further comprising receiving information associated with the product for at least one other designated period of time for the entity, wherein if the entity is selected, sending the notification to at least one of the entity, a distribution facility associated with the entity, and a corporate office associated with the entity.

4. The method of claim 1, wherein the entity is a plurality of entities and further comprising sending a summary of the selected entities of the plurality of entities to at least one of the plurality of entities, a distribution facility associated with the plurality of entities, a corporate office associated with the plurality of entities, and an associated supplier.

5. The method of claim 1, further comprising receiving information associated with a competing product, wherein the information comprises an on-hand inventory quantity of the competing product and a total sales quantity of the competing product for a designated period of time for an entity, and further comprising determining whether the on-hand inventory quantity of the competing product is at least one and the total sales quantity of the competing product for the designated period of time is a low value.

6. The method of claim 5, further comprising sending the notification to at least one of the entity, the distribution facility associated with the entity, the corporate office associated with the entity, and the associated supplier if it is determined that the on-hand inventory quantities of the product and the competing product are at least one and the total sales quantity of the product is zero and the total sales quantity of the competing product is the low value, wherein the notification indicates that a product type associated with the product and competing product is performing poorly.

7. The method of claim 1, further comprising receiving at least one of a sales history associated with the product, a product type, and an entity identifier.

8. The method of claim 7, further comprising determining the designated period of time based on at least one of the sales history, the product type, and the entity identifier via the processor.

9. The method of claim 1, further comprising requesting the information associated with the product.

10. The method of claim 1, further comprising generating a report comprising the selected entity.

11. The method of claim 10, wherein the report comprises at least one of a date field, a product number field, an entity field, a vendor stock number field, a product description field, a quantity of entities field, a field indicating a quantity of entities with zero product on shelf, and a field indicating a quantity of entities having zero product on shelf and the on-hand inventory quantity as zero.

12. A computer-based system for tracking inventory, the system comprising:
   a processor configured to process, manage, and analyze data; and,
   a computing device operably coupled to the processor, wherein the computing device is associated with an entity, wherein the at least one processor is configured to:
     request information associated with a product from the computing device, wherein the information comprises an on-hand inventory quantity of the product and a total sales quantity of the product for a designated period of time for the entity;
     receive the requested information associated with the product from the computing device;
     determine whether the on-hand inventory quantity is at least one and the total sales quantity of the product for the designated period of time is zero; and
     select the entity when it is determined that the on-hand inventory quantity is at least one and the total sales quantity of the product for the designated period of time is zero; and
     send a notification to at least one of the computing device associated with the entity, a computing device associated with a distribution facility associated with the entity, and a computing device associated with a corporate office of the entity when the entity is selected, wherein the notification indicates at least one of possible product misplacement, possible product theft, and that the on-hand inventory quantity may be incorrect.

13. The system of claim 12, further comprising at least one database operably coupled to the processor, wherein the at least one database is configured to store data.

14. The system of claim 13, wherein the processor is configured to generate a report comprising the selected entity and transmit the report to the at least one database for storage.

15. The system of claim 14, wherein the report comprises at least one of a date field, a product number field, an entity field, a vendor stock number field, a product description field, a quantity of entities field, a field indicating a quantity of entities with zero product on shelf, and a field indicating a quantity of entities having zero product on shelf and the on-hand inventory quantity as zero.

16. The system of claim 12, wherein the processor is configured to receive information associated with the product for at least one other designated period of time from the computing device, wherein if the entity is selected, sending a notification to at least one of the computing device associated with the entity, a computing device associated with a distribution facility associated with the entity, and a computing device associated with a corporate office of the entity, wherein the notification indicates at least one of possible product misplacement, possible product theft, and that the on-hand inventory quantity may be incorrect.

17. The system of claim 12, wherein the processor is configured to receive information associated with a competing product, wherein the information comprises an on-hand inventory quantity of the competing product and a total sales quantity of the competing product for a designated period of time for an entity, and wherein the processor is further configured to determine whether the on-hand inventory quantity of the competing product is at least one and the total sales quantity of the competing product for the designated period of time is a low value.

18. The system of claim 17, wherein the processor is configured to send a notification to at least one of the computing device associated with the entity, a computing device associated with a distribution facility associated with the entity, a computing device associated with a corporate office of the entity, and a computing device associated with a supplier if it is determined that the on-hand inventory quantities of the product and the competing product are at least one and the total sales quantity of the product is zero and the total sales quantity of the competing product is the low value, wherein the notification indicates that a product type associated with the product and competing product is performing poorly.

19. The system of claim 12, wherein the processor is configured to receive at least one of a sales history, a product type, and an entity identifier, wherein the processor is configured to determine the designated period of time based on at least one of the sales history, the product type, and the entity identifier.

20. A non-transitory computer-readable storage medium having stored therein computer-readable instructions, which, when loaded in and executed by a computer, causes the computer to perform the steps of:
receiving information associated with a product, wherein the information comprises an on-hand inventory quantity of the product and a total sales quantity of the product for a designated period of time for an entity;
determining whether the on-hand inventory quantity is at least one and the total sales quantity of the product for the designated period of time is zero, wherein the determination is performed by a processor; and
when it is determined that the on-hand inventory quantity is at least one and the total sales quantity of the product for the designated period of time is zero, generating a report comprising the entity.

21. A computer-based method for tracking inventory, the method comprising:
receiving information associated with a product, wherein the information comprises an on-hand inventory quantity of the product and a total sales quantity of the product for a designated period of time for an entity associated with the product;
determining whether the on-hand inventory quantity is at least one and the total sales quantity of the product for the designated period of time is zero, wherein the determination is performed by a processor; and
when it is determined that the on-hand inventory quantity is at least one and the total sales quantity of the product for the designated period of time is zero, generating by the processor a notification indicating that the on-hand inventory quantity is incorrect.

* * * * *